(12) United States Patent
Lee

(10) Patent No.: US 9,223,449 B2
(45) Date of Patent: Dec. 29, 2015

(54) BLACK IMAGE INSERTION FOR CAPACITIVE SENSING

(71) Applicant: Synaptics Incorporated, Santa Clara, CA (US)

(72) Inventor: Sinsuk Lee, Cupertino, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 301 days.

(21) Appl. No.: 13/828,076

(22) Filed: Mar. 14, 2013

(65) Prior Publication Data

US 2014/0267349 A1 Sep. 18, 2014

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0416* (2013.01)

(58) Field of Classification Search
CPC ............... G06T 19/00; H04N 21/4312; H04N 2005/443; G06F 3/0485; G06F 3/017; G06F 3/0488; G06F 3/044; G06F 3/0418; G06F 3/0416; G06F 3/0412; G06F 1/1692
See application file for complete search history.

(56) References Cited

U.S. PATENT DOCUMENTS

| | | | |
|---|---|---|---|
| 7,855,718 B2 * | 12/2010 | Westerman | 345/173 |
| 2011/0050640 A1 * | 3/2011 | Lundback et al. | 345/175 |
| 2012/0120205 A1 | 5/2012 | Kobayashi | |
| 2013/0278539 A1 * | 10/2013 | Valentine et al. | 345/174 |

* cited by examiner

*Primary Examiner* — Antonio A Caschera
(74) *Attorney, Agent, or Firm* — Patterson & Sheridan, LLP

(57) ABSTRACT

When performing capacitive sensing, a modulated signal is driven on transmitter electrodes located only within a black image of the display device. When updating a display screen based on a newly received display frame, an input device may first insert the black image on the display screen. Once the black image is displayed, the input device may use the electrodes within the area of the screen displaying the black image to track the input object using capacitive sensing (e.g., determine if the user is pressing a finger or stylus on the screen). In this manner, performing capacitive sensing affects only the pixels displaying the black image which is not perceived by the user. After performing capacitive sensing using the electrodes, the input device may replace the black image with display data from the new display frame.

17 Claims, 9 Drawing Sheets

BLACK IMAGE INSERTION FOR CAPACITIVE SENSING

BACKGROUND OF THE INVENTION

1. Field of the Invention

Embodiments of the present invention generally relate to inserting a black image on a display screen, and more specifically, to performing capacitive sensing using electrodes located within the inserted black image.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment of the present disclosure includes a method that transmits a first display image for display on a first portion of a display screen of a display device. The method transmits a black image for display on the first portion of the display screen after outputting the first display image where the black image comprises a plurality of contiguous display lines of the display screen. The method identifies a transmitter electrode located substantially within the first portion of the display screen. The method drives a signal on the identified transmitter electrode to determine positional information when the black image is displayed on the first portion of the display screen.

Another embodiment of the present disclosure includes a display device include a display screen, a plurality of electrodes configured for determining positional information using capacitive sensing, and a processor. The processor is configured to transmit a first display image for display on a first portion of the display screen, and transmit a black image for display on the first portion of the display screen after outputting the first display image where the black image comprises a plurality of contiguous display lines of the display screen. The processor is configured to identify a first one of the transmitter electrodes located substantially within the first portion of the display screen. The processor is further configured to drive a signal on the first transmitter electrode to determine positional information when the black image is displayed on the first portion of the display screen.

Another embodiment of the present disclosure includes a processing system for a display device. The processing system includes a display driver module configured to update a display screen, the display driver module configured to transmit a first display image for display on a first portion of a display screen of a display device. The display driver module is configured to transmit a black image for display on the first portion of the display screen after outputting the first display image, wherein the black image comprises a plurality of contiguous display lines of the display screen. The processing system further comprises transmitter circuitry configured to identify a transmitter electrode located substantially within the first portion of the display screen and drive a signal on the identified transmitter electrode to determine positional information when the black image is displayed on the first portion of the display screen.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
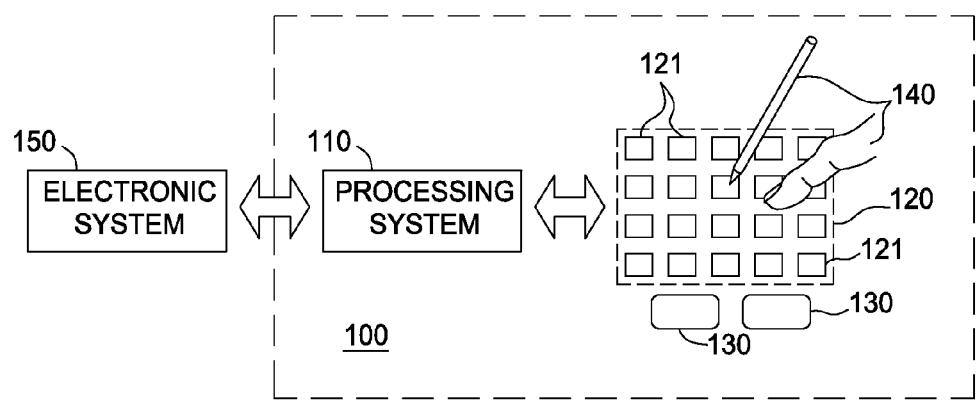
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Inputs devices may have proximity sensors that are in close proximity to a display screen—e.g., a cellular phone with a touch-enabled display screen. To operate the proximity sensors to track an input object, the input device may drive a modulated electric signal onto transmitter electrodes and detect a change in an electrical property (e.g., capacitance) between the transmitter electrodes and receiver electrodes caused by the input object. These modulated signals, however, may have a negative impact of the display screen. Specifically, the signals may cause a voltage stored by the pixels to vary. This variance may be perceived by the user as a visual anomaly such as a visual artifact or color distortion.

To avoid the negative effect the modulated signal may have on a displayed image, the input device may drive the signal only on electrodes within a black image of the display device. When updating a display screen based on a newly received display frame, the input device may first insert the black image on the display screen. For example, the input device may drive the pixels on the first twenty rows of the display device such that the pixels output the color black. Once the black image is displayed, the input device may drive the modulated signal only on the electrodes within the area of the screen displaying the black image to track the input object using capacitive sensing (e.g., to determine if the user is pressing a finger or stylus on the screen). Thus, driving the modulated signal affects only the pixels displaying the black band which is not perceived by the user. After performing capacitive sensing, the input device may replace the black image such that this portion of the screen now displays an updated image based on the new display frame.

In one embodiment, the black image may be displayed on only a subset of the display screen, which is referred to herein as a "black band". The input device may then insert the black band at a second portion of the display screen and drive the modulated signal only on the electrodes within this second portion. In this manner, the process may be repeated until the entire display screen has been updated based on the new display frame. That is, the display screen may be divided into a plurality of sections where each section is blacked out, capacitive sensing is performed, and the pixels are updated based on the data in the new display frame.

In addition to reducing the effect that capacitive sensing may have on the displayed image, inserting black images when updating pixels may also decrease the time needed to update the pixels relative to systems where black image insertion is not used. In some input devices, the display used in the pixels material (e.g., liquid crystal) may respond slower to slight changes in voltage rather than large changes in voltage. That is, if the display frame instructs the input device to change a pixel's voltage from 2 V to 1.8V, this change may take longer than driving the pixel's voltage from 2V to 0V. Accordingly, before updating a display screen, the input device may first drive the pixels to black before driving the pixels to the desired voltage dictated in the display frame. In some embodiments, inserting a black image may require less time and leave less visual artifacts than directly driving the pixels from an old voltage set by the previous frame to a new voltage set by the subsequent display frame.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zerodimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
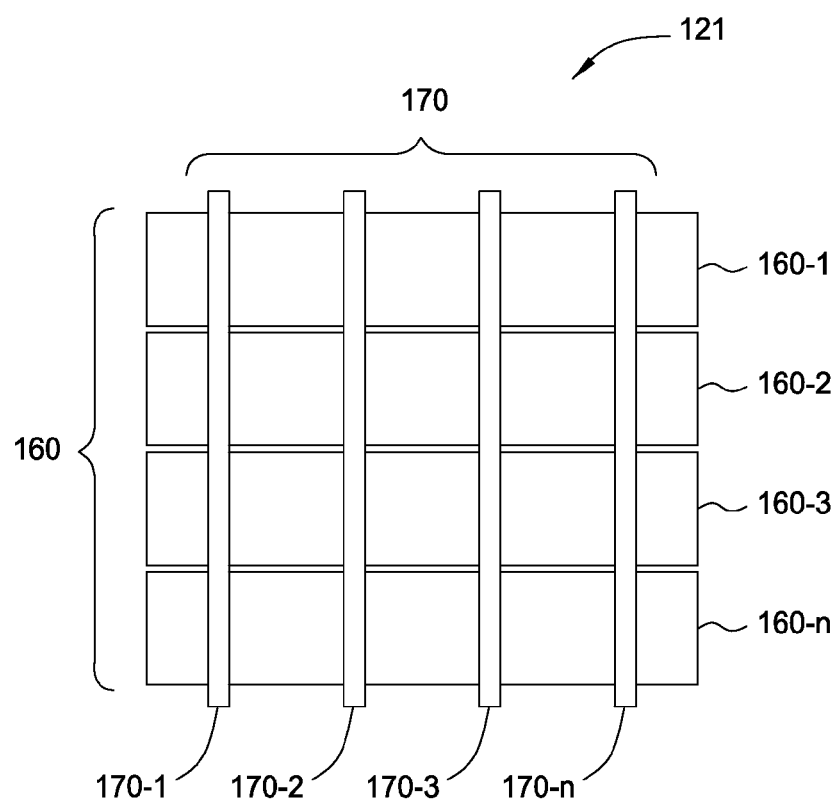
FIG. 2 illustrates a stack-up of a sensor assembly that may be used in the input device to sense the input object, according to an embodiment described herein.

FIG. 2 shows a portion of an exemplary pattern of sensing elements 121 configured to sense in a sensing region associated with the pattern, according to some embodiments. For clarity of illustration and description, FIG. 2 shows the sensing elements 121 in a pattern of simple rectangles, and does not show various components. This pattern of sensing elements 121 comprises a first plurality of sensor electrodes 160 (160-1, 160-2, 160-3, ... 160-n), and a second plurality of sensor electrodes 170 (170-1, 170-2, 170-3, ... 170-n) disposed over the plurality of transmitter electrodes 160. In one embodiment, this pattern of sensing elements 121 comprises a plurality of transmitter electrodes 160 (160-1, 160-2, 160-3, ... 160-n), and a plurality of receiver electrodes 170 (170-1, 170-2, 170-3, ... 170-n) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode" or source drive electrode) used in updating the display of the display screen. These common electrodes may be disposed on an appropriate display screen substrate. For example, the common electrodes may be disposed on the TFT glass in some display screens (e.g., In Plane Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Performing Capacitive Sensing within Black Images

Figure 3A:
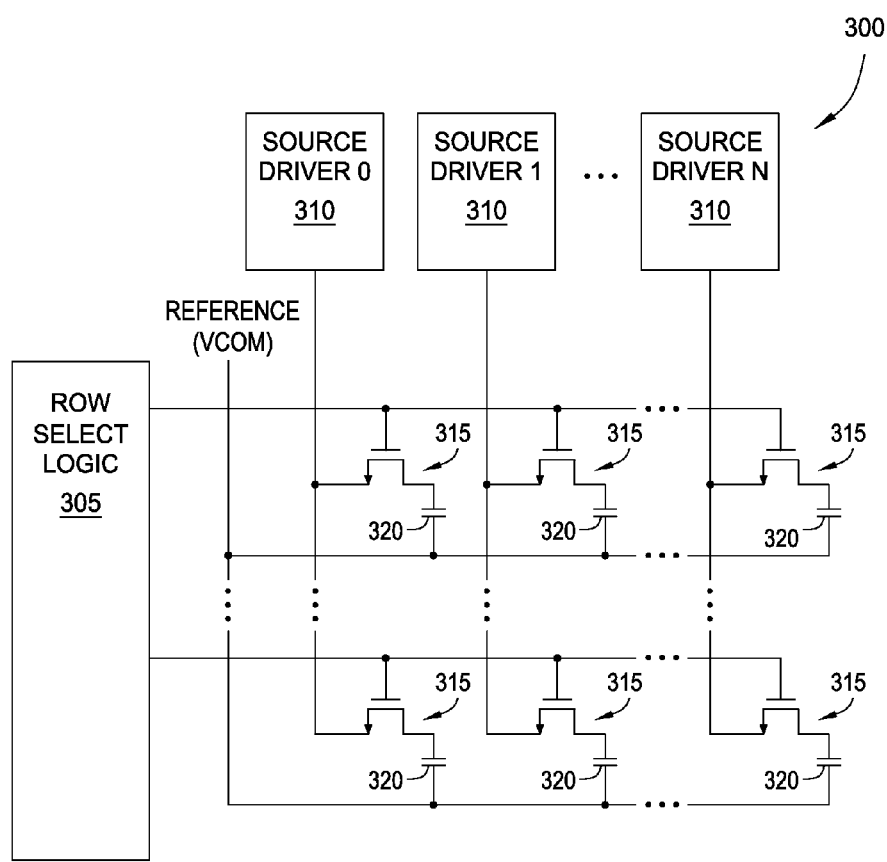
FIGS. 3A-3B illustrate systems for updating pixels in a display screen, according to embodiments described herein.
Figure 3B:
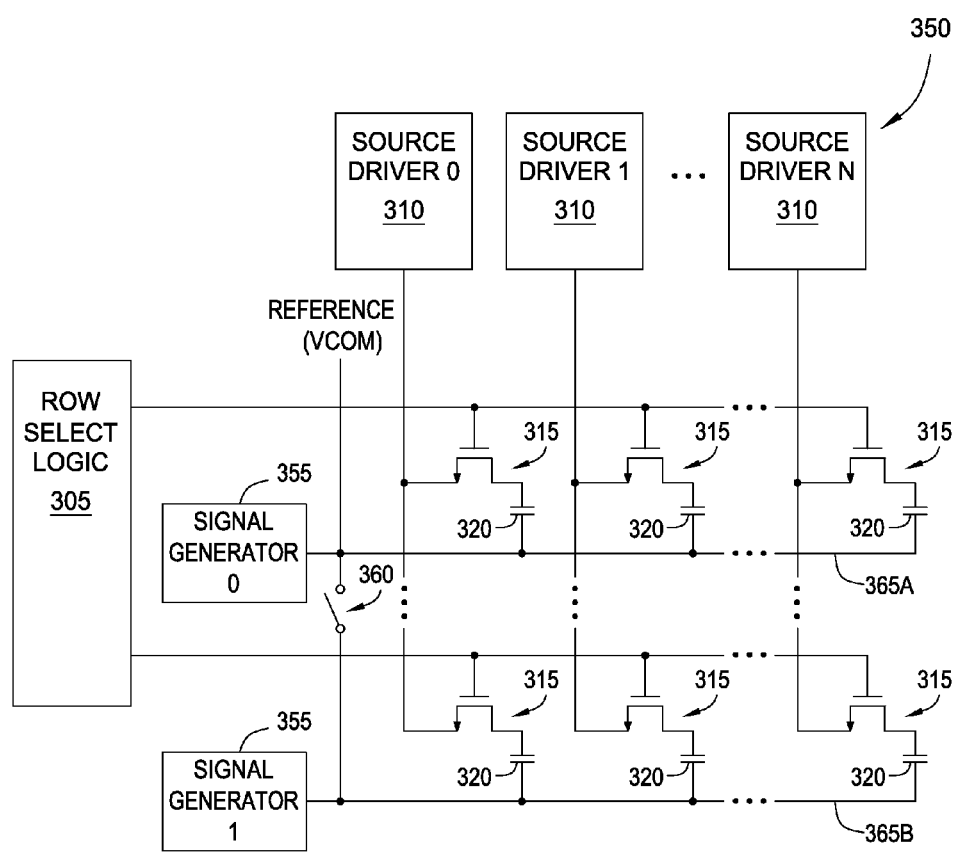

FIGS. 3A-3B illustrate systems for updating pixels in a display screen, according to embodiments described herein. Specifically, FIG. 3A illustrates a system 300 that includes row select logic 305 and a plurality of source drivers 310 coupled to pixels 315. For example, system 300 may be part of a display device in input device 100 discussed in FIG. 1. The row select logic 305 (also referred to as gate selection logic) may select one of the rows (or gate lines) by activating the respective transistor switches in the pixels 315. When on, these switches enable a conductive path through which source drivers 310 may drive a desired voltage across the capacitors 320. The voltage on the capacitors 320 is defined by the voltage difference between the voltage on the column lines (or source lines connected to source driver 310) and the reference voltage (e.g., V-com). In one embodiment, the capacitance of capacitors 320 may be based on, at least in part, the liquid crystal material used to set the color associated with the pixels 315. However, the embodiments described herein are not limited to any particular display technology and may be used, for example, with LED, OLED, CRT, plasma, EL, or other display technology.

The row select logic 305 may raster through the individual rows of the display screen until all the pixels have been updated (referred to herein as a display frame update). For example, the row select logic 305 may activate a single row using an individual row line. In response, the source drivers 310 may drive respective voltages onto the source lines that generate a desired voltage (relative to the reference voltage) across the capacitors 320 in the selected row. The row select logic 305 may then de-activate this row before activating a subsequent row. In this manner, the row select logic 305 and the source drivers 310 may be controlled by, for example, a display driver module on the processing system such that source drivers 310 provide the correct voltage for the pixels 315 as the row select logic 305 activates each row individually.

When inserting a black image in a display image, the row select logic 305 may activate a plurality of the row lines simultaneously. For example, when inserting a "black frame" (i.e., where all the rows in the display screen display the color black), the row select logic 305 may activate all of the row lines simultaneously. But when inserting a black band (i.e., only a subset of the rows display the color black), the row select logic 305 may activate only a portion of the row lines simultaneously (e.g., the first twenty row lines). Because the pixels in the activated rows should display the same black color, the source drivers 310 drive the voltage corresponds to outputting a black color across the capacitors 320. In this manner, each source driver 310 may drive pixels on different rows to the same voltage in parallel. Accordingly, the black frame or band may be inserted in a display screen in approximately the same amount of time required to update a single row or pixel of the display screen. After the black band or frame is displayed on the screen, the row select logic 305 and source drivers 310 may then raster through the rows and update the individuals pixels based on data associated with a new display frame. Although not shown, system 300 may include proximity sensors (e.g., the transmitter electrodes of the processing system 110 discussed above in FIG. 1) that may be used to perform capacitive sensing (i.e., detect user input) in areas of the screen that display the black bands. The proximity sensors (e.g., transmitter electrodes 160 and receiver electrodes 170 in FIG. 1) may be separated from the system 300 by one or more insulative layers. As will be discussed in greater detail below, capacitive sensing may alter the values of the voltages stored on the capacitors 320.

Accordingly, capacitive sensing may be performed only in the areas of the display screen where the pixels 315 are currently set to display a black color. In this manner, any negative effects of capacitive sensing may be mitigated since variations in the black band or frame are not perceived by the user.

FIG. 3B illustrates a system 350 where the electrodes used to carry the reference voltage are also used to carry the transmitter signals for capacitive sensing. More specifically, the electrodes (e.g., common electrodes 365) used to apply the reference voltage to one side of the capacitors 320 during display updating may also be used to transmit the modulated electrical signal during capacitive sensing. For example, each common electrode 365 may be a transmitter electrode 160 or a plurality of electrodes 365 may be grouped to form a single transmitter electrode 160. As such, system 350 includes signal generators 355 for generating the transmitter signal on the common electrodes 365 and one or more switches 360 for segmenting the common electrodes 365. When updating the display, switch 360 may be closed thereby coupling the different electrodes 365 to the reference voltage. As the row select logic 305 and source drivers 310 update the voltages stored in the pixels 315, the signal generators 355 may be inactive (e.g., have infinite input impedance).

When performing capacitive sensing, switch 360 may be opened which electrically insulates or segments the various common electrodes 365 into separate electrodes—i.e., electrode 365A and 365B—like the segmented transmitter electrodes 160 shown in FIG. 1. Each signal generator 355 may be selectively controlled to transmit the transmitter signal for detecting user input. For example, Signal Generator 0 may drive the transmitter signal for a predefined period of time before Signal Generator 1 begins to drive the transmitter signal. In this manner, the electrodes 365 may have dual functions. Although FIG. 3B illustrates connecting one row to each signal generator 355, multiple common electrodes 365 may be combined or grouped into a transmitter electrode that is driven by a respective signal generator 355. Moreover, even though system 350 illustrates using the electrodes that carry the reference voltage as the common electrodes 365, in other embodiments, it may be desirable to use other electrodes, such as the row or columns lines, as common electrodes for driving the transmitter signals during capacitive sensing.

Like in system 300 of FIG. 3A, system 350 may insert a black image when updating the display screen. For example, the row select logic 305 may activate the upper row line which permits the source drivers 310 to drive the same voltage across the pixels 315 (assume that the lower row line is de-activated thereby preventing the voltage associated with these pixels 315 from changing). When performing capacitive sensing, system 350 may use Signal Generator 0 to drive the transmitter signal along common electrode 365A while Signal Generator 1 remains inactive. Thus, any negative effects from generating the transmitter signal is limited to the pixels 315 in the upper row which are in close proximity to common electrode 365A. Because the upper row pixels 315 are currently displaying black, the negative effects are not perceived by the user.

Figure 4:
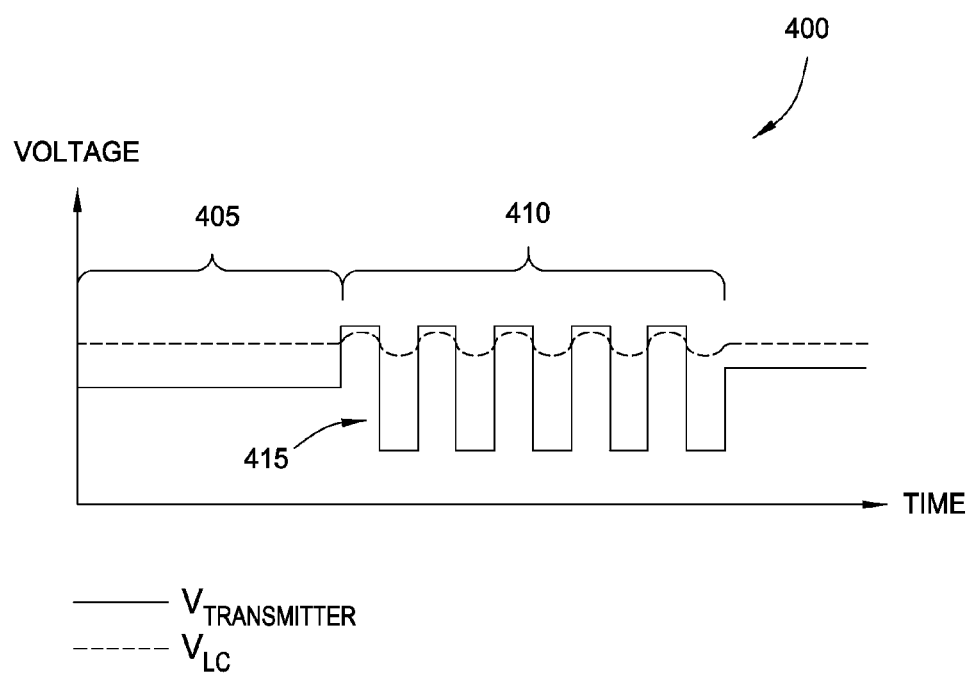
FIG. 4 is a chart illustrating the effect of performing capacitive sensing on voltages stored by a liquid crystal capacitance, according to one embodiment described herein.

FIG. 4 is a chart 400 illustrating the effect of performing capacitive sensing on voltages stored by a liquid crystal capacitance, according to one embodiment described herein. Specifically, chart 400 illustrates that generating the transmitter signal 415 for performing capacitive sensing may affect the voltage across a liquid crystal capacitance ($V_{LC}$). During the time period 405, an input device may be updating the display. At this time, the electrodes used for carrying the transmitter signals may be inactive—e.g., the voltage on the transmitter electrodes ($V_{TRANSMITTER}$) (e.g., common electrode 365 in FIG. 3) may be fixed at a certain voltage. If the transmitter electrodes are used in both display updating and capacitive sensing, during period 405, the transmitter electrodes may be held at the reference voltage. During time period 410, capacitive sensing begins and the transmitter signal 415 is driven onto the transmitter electrodes. Because of capacitance coupling, $V_{LC}$ is affected by the transmitter signal—as shown here as a ripple. In one embodiment, the effect of the transmitter electrode on $V_{LC}$ may vary based on the proximity of the transmitter electrodes to the liquid crystal capacitance. Thus, the closer the transmitter electrode is to the liquid crystal capacitance, the greater effect on $V_{LC}$. The variations shown in chart 400 may be perceived by the user as, for example, discoloration.

Figure 5:
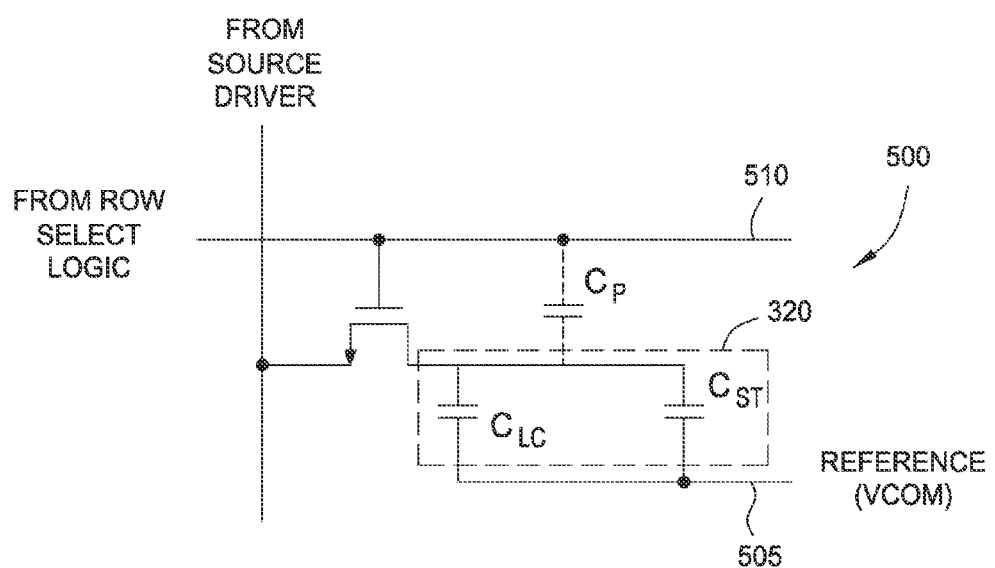
FIG. 5 illustrate a circuit where performing capacitive sensing may affect the voltages stored by liquid crystal capacitances, according to embodiments described herein.

FIG. 5 illustrates a circuit 500 where performing capacitive sensing may affect the voltages stored by liquid crystal capacitances, according to embodiments described herein. Specifically, FIG. 5 illustrates a circuit 500 where driving a transmitter signal on a common electrode 505 (i.e., the reference electrode) may affect the voltage across the liquid crystal capacitance ($C_{LC}$) or the storage capacitance ($C_{ST}$) which, in one embodiment, may be different capacitances associated with capacitor 320 of FIG. 3. Circuit 500 illustrates a single pixel coupled to row and column lines. When activated by the row select logic, the source drive sets a voltage across the liquid crystal capacitance and the storage capacitance using the reference voltage provided by the common electrode 505.

During capacitive sensing, the row and column lines may be deactivated while the common electrode 505 carries the transmitter signal. That is, in one embodiment, the common electrode 505 may be used for both touch sensing and display updating like common electrodes 365 in FIG. 3. Although the liquid crystal capacitance and the storage capacitance may not be directly connected to the row and column lines during capacitive sensing, circuit 500 may introduce a parasitic capacitance ($C_P$) which electrically couples one end of the liquid crystal capacitance and the storage capacitance to the row line 510. The parasitic capacitance creates an electrical path that permits the transmitter signal to change the charge across the liquid crystal capacitance and the storage capacitance. Stated differently, because the liquid crystal and storage capacitances are capacitivately linked to either the row or column lines, driving the transmitter signal may cause the voltage across the capacitances to vary as shown in chart 400 of FIG. 4.

FIG. 5 illustrates a pixel control design where driving the transmitter signal on the common electrodes 505 may affect the charge or voltage associated with either the liquid crystal capacitance or the storage capacitance. However, the techniques described herein are not limited to these designs. Instead, the present embodiments may apply to any pixel design where inserting a black image may improve the ability of an input device to update the display or perform touch sensing. In other embodiments, the source lines or row lines may be used for carrying the transmitter signal during capacitive sensing instead of the reference line 505. Doing so may also cause the voltage across the capacitances to vary as shown in chart 400. Moreover, FIG. 5 illustrates an embodiment where a common electrode is used when updating the display and performing touch sensing, but the techniques are not limited to such. The voltage fluctuation shown in chart 400 of FIG. 4 may occur when display updating and capacitive sensing are performed using independent electrodes that are not shared. For example, transmitter electrodes located on a different layer from the one shown in circuit 500 may be capacitively connected to the reference electrode 505 by a parasitic capacitance. This parasitic capacitance may create an electrical path between the transmitter electrode and the row line (via $C_{LC}$ and $C_{ST}$). This electrical path may permit the transmitter signal to alter the charge stored on the liquid crystal or storage capacitances. Thus, the voltage fluctuations shown in chart 400 of FIG. 4 may also apply to input devices that do not share common electrodes when updating a display and performing capacitive sensing.

Figure 6:
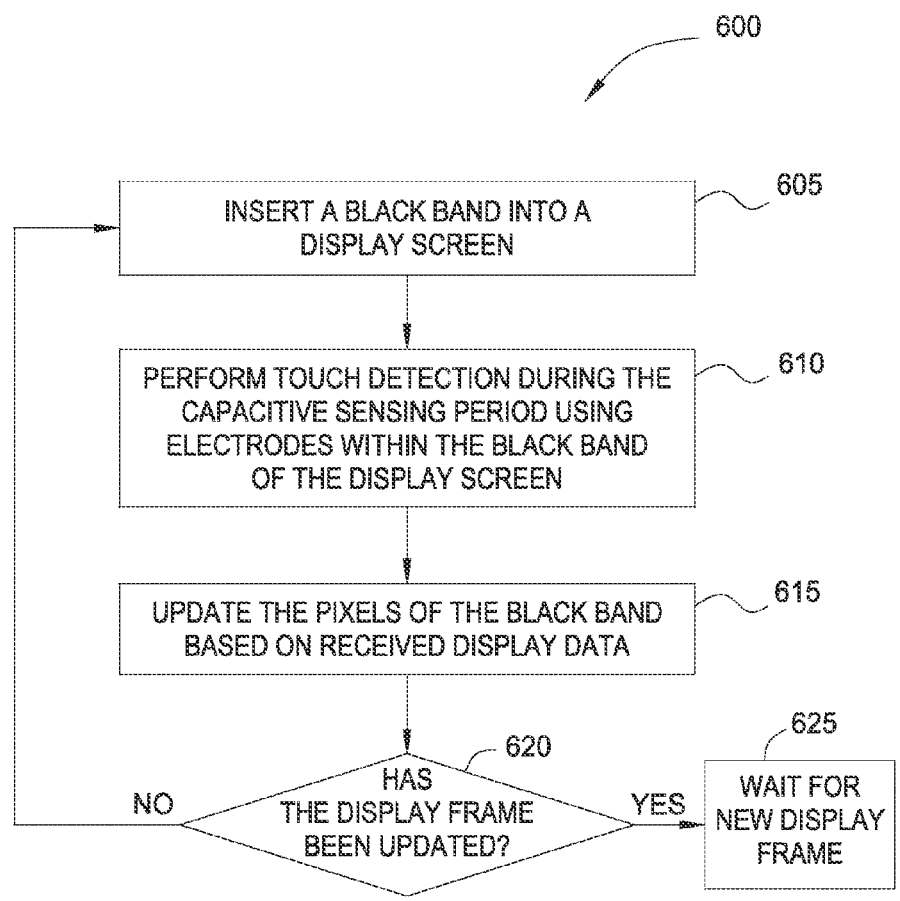
FIG. 6 is a method for performing touch sensing using electrodes within a black band, according to one embodiment described herein.

FIG. 6 is a method 600 for performing capacitive sensing using electrodes within a black band, according to one embodiment described herein. For ease of explanation, method 600 will be described in parallel with FIG. 7 which graphically illustrates inserting a black band into a displayed image.

At block 605, a processing system inserts a black band into a display screen using, e.g., a display driver module. As shown, image 705 may be a full display frame that covers the displayable portion of a display screen but this is not a requirement. Further, image 705 illustrates, using dotted lines, that a display screen may be (logically) divided into a plurality of sections where each section may include one or more rows of pixels. Moreover, although as shown as being symmetrical (i.e., the sections contain the same number of rows) the rows of the display screen may be divided in any manner desired. Image 710 illustrates inserting a black band 750 into the displayed image at one of the sections. As discussed previously, inserting the black band 750 may take the same amount of time required to update a single pixel or row. For example, the row select logic may activate a plurality of rows simultaneously while the source drivers, in parallel, drive the same voltage to the plurality of pixels in the activated rows. For the duration of the capacitive sensing period, the image displayed on the display screen includes the black band 750.

Figure 7:
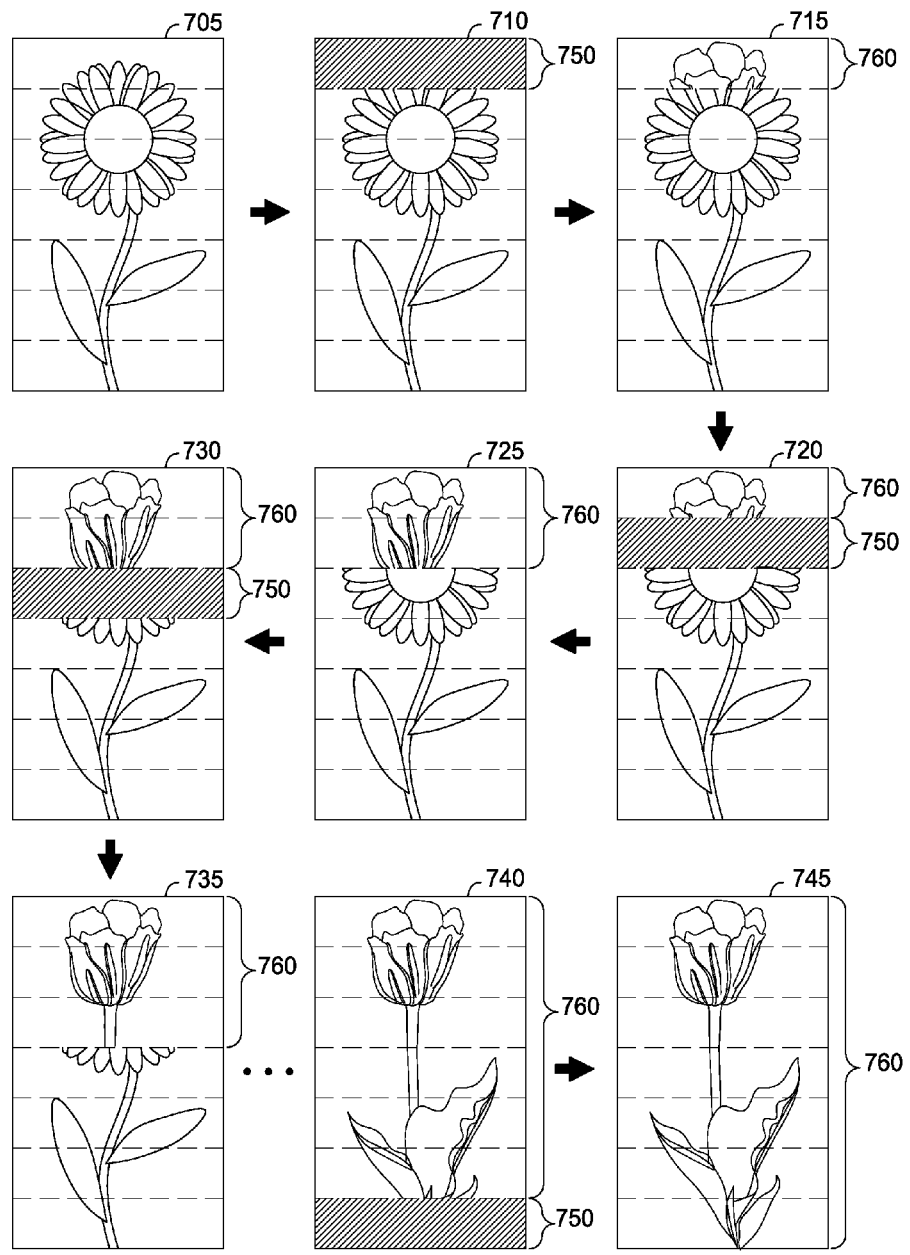
FIG. 7 is a technique for performing capacitive sensing in conjunction with inserting a black band into a displayed image, according to one embodiment described herein.

At block 610, the processing system detects user input during the capacitive sensing period. Specifically, the processing system may drive transmitter signals on proximity sensors (e.g., transmitter electrodes) that are located substantially within the black band 750 in the display image 710. As used herein, "substantially" within the black image is intended to convey that some of the electrodes used to carry the transmitter signal may not be directly within the area defined by the pixels that display the black image. For example, the electrodes used to carry the transmitter signal may be a proximate to the black image (e.g., within a few millimeters) and still offer the advantages discussed herein. As shown in FIG. 7, black band 750 defines a physical region within the display screen that may include a plurality of transmitter electrodes. The transmitter electrodes may either be common electrodes that are used both when updating the display and performing capacitive sensing, or independent electrodes that are separate from the electrodes used when updating the display. In either case, in one embodiment, the processing system selectively controls the transmitter signal driven on the transmitter electrodes such that the signal is driven only on the electrodes located substantially within the black band 750. For example, the processing system may include a mapping that indicates which transmitter electrodes to use given the current location of the black band 750—e.g., if the black band 750 is asserted on rows 1-40, only the first two transmitter electrodes are used assuming these electrodes are within the first forty rows.

In one embodiment, display updating for the display screen may be paused while the capacitive sensing in the area of the black band occurs. Alternatively, in other embodiments, portions of the display screen outside of the black band may be updated according to a new display frame while capacitive sensing occurs within the portion of the display screen displaying the black band.

At block 615 of method 600, the processing system updates the pixels in the black band 750 with data from the newly received display frame. As shown by image 715, the portion of the display screen previously occupied by the black band 750 has been replaced by a corresponding portion 760 of the new display frame.

At block 620 of method 600, the processing system determines if the display screen has updated the entire display frame. As shown by image 715 of FIG. 7, only the top section of the screen has been updated with the new frame. Accordingly, method 600 returns to block 605 to insert the black band into a different section of the display screen. Image 720 illustrates inserting the black band 750 into the next section of the display screen. Method 600 then repeats except that, during capacitive sensing, only the transmitter electrodes in the portion of the screen containing the new location of black band 750 are used. That is, any transmitter electrodes in the updated portion 760 as well as the non-updated portion of the image are not used. In image 725, the black band 750 is replaced by updating the second portion of the screen based on the data contained in the new display frame such that the update portion 760 of the display screen now includes both the first and second sections.

Method 600 again repeats and the processing system inserts the black band 750 into the third section of the display screen as shown by image 730. Touch sensing is performed within the black band 750 and the black band 750 is replaced based on the data in the new display frame (as shown in image 735). Eventually, as shown by image 740, the processing system inserts the black band 750 into the last section of the display screen. After performing capacitive sensing at the last section, image 745 illustrates updating the screen to display the entirety of the new display frame. Because capacitive sensing is interleaved with updating the display, when the new frame is displayed the processing system has also completed a capacitance image for detecting user interaction with the device.

Once the processing system has updated the display screen based on a new display frame, at block 625, method 600 waits for a new display frame to be received which then causes method 600 to return to block 605 to repeat the process described above. However, in one embodiment, the processing system may only perform blocks 605-615 in certain instances. For example, the processing system may update the display screen with a new display frame sixty times a second but may only generate a capacitance image twenty times a second. Thus, two-thirds of the time the processing system may update the display screen without using interleaved capacitive sensing periods. In these instances, the processing system may display a black frame (i.e., drive all the pixels to black in parallel) and update the individual rows based on the new display frame without pausing to perform capacitive sensing.

As shown in images 705-745, the processing system inserts the black band 750 in sequential sections. However, in one embodiment, the system may insert the band in non-sequential sections. Doing so may further mitigate visual artifacts that result from performing touch sensing. In one embodiment, the system may insert multiple, non-contiguous black bands onto the display screen simultaneously. For example, display lines 1-10 may be a first portion of the black band while display lines 20-30 are a second portion of the black band. In one embodiment, the processing system may perform capacitive sensing in both of these portions in parallel.

Although method 600 and the images of FIG. 7 illustrate dividing a display screen into a plurality of sections where a black band is inserted in each section, the present disclosure is not limited to such. For example, instead of inserting the black band 750 in image 710, the processing system may insert a black frame that changes all the pixels in the display screen to black. Capacitive sensing may then be performed at any section within the black frame. The processing system may then update the section after the capacitive sensing is performed based on the new display frame. Advantageously, the black frame insertion is performed only once during a frame update rather than use multiple black band insertions as shown in FIG. 7.

Although FIG. 7 illustrates generating a single capacitive image while performing a display frame update—i.e., the ratio of the display frame update rate and the capacitive image update rate is 1:1—the present embodiments are not limited to such. For example, black band insertion may still be used even if the capacitive image update rate is faster or slower than the display update rate. If the capacitive image update rate is faster, instead of replacing the black band 750 with a portion from the new display frame, the portion of the old display frame is displayed. For example, if the ratio between capacitive image update rate and display image update rate is 2:1, during one capacitive image update the old image (i.e., the daisy) is re-displayed on the screen while in the subsequent capacitive image update the new image (i.e., the tulip) is displayed on the screen as shown in FIG. 7. Thus, black band insertion may be used when the capacitive image update rate is different from the display frame update rate.

Note that FIG. 7 illustrates updating the display screen where the previous display frame is very different from the subsequent display frame. However, many display frames updates may simply be a refresh of the previous frame, or slight variation thereof. Nonetheless, inserting a black image may still minimize visual anomalies. Indeed, based on the physical properties of the display medium used in screen's pixels, inserting black bands may have a greater effect on minimizing visual anomalies in situations where the difference between the previous and new frame is slight rather than drastic. Accordingly, the techniques described herein may be used to improve display updating and capacitive sensing in input devices where variations between subsequent frames are either slight or great.

Figure 8:
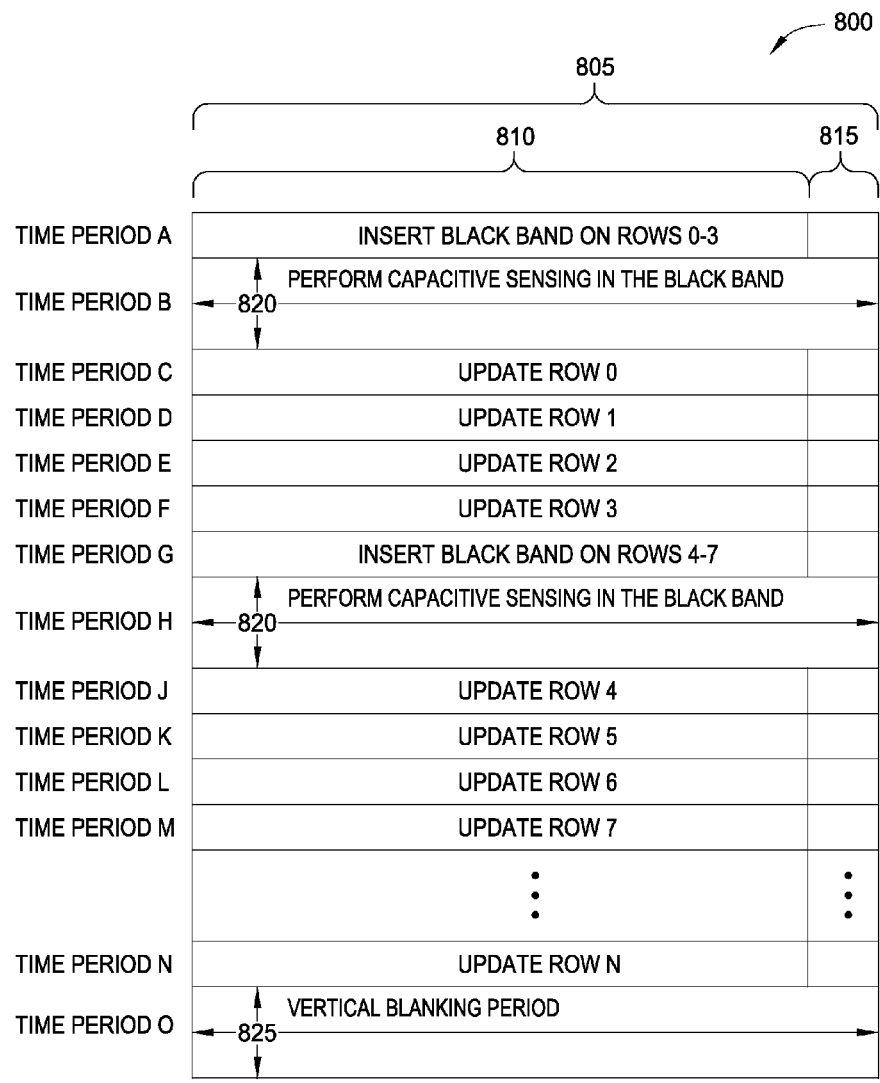
FIG. 8 is a timing chart for processing a display frame with interleaved capacitive sensing periods, according to one embodiment disclosed herein.

FIG. 8 is a timing chart 800 for processing a display frame with interleaved capacitive sensing periods 820, according to one embodiment disclosed herein. Specifically, timing chart 800 illustrates the different time periods when performing a display frame update. Time periods C-F and J-M each represent the time used to update a single row (or display line) of a display screen in the input device. This row update time is further divided into a time period used to update the pixels in the row 810 and a buffer time 815 that occurs between each row update 805. The buffer time 815 may be also referred to as a horizontal blanking period 815. The processing system in the input device may use the horizontal blanking period 815 to, for example, retrieve data needed to update the next row, drive a voltage onto the common electrode(s) corresponding to the row, or allow signals to settle to reduce interference when updating subsequent rows. Nonetheless, the embodiments disclosed herein are not limited to an input device with a horizontal blanking period 815 and may be used in a system where there is no buffer time 815 between the pixel update period 810 and the next row update 805. In various embodiments, the horizontal blanking time 815 is reduced in length such that it is substantially non-existent. In another embodiment, the horizontal blanking time 815 is reduced in length such that it is no longer than the time needed to configure a common electrode to update a row.

A display frame, however, may not update each row of the display screen if, for example, only a portion of the display screen is actively displaying information. Thus, rows 0-N in chart 800 may represent only a subset of the total rows in the display screen.

Prior to updating the rows, however, chart 800 illustrates inserting a black band that covers a plurality of rows in the display screen (although the black band may cover only a single row) at Time Periods A and G. As shown, inserting the black band on multiple rows may take substantially the same amount of time as updating a single row. Time periods B and H represent the time used for performing capacitive sensing, or a capacitive sensing period. These time periods may be at least as long as the time to update a single row of the display screen—e.g., Time Period B is at least as long as Time Period C. In other embodiments, Time Periods B and H are longer than the time used to update a single line of a display screen. Moreover, the input device may use the same common electrodes used to update the pixels of the display screen (i.e., the electrodes that provide the reference voltage) to also carry the transmitter signal. That is, the common electrodes may serve dual purposes. During a display update period or a black band insertion period, a common electrode (or electrodes) updates the pixels in the display, but during a capacitive sensing period, the common electrodes are used as transmitter electrodes.

In one embodiment, after inserting the black band on rows 0-3 during Time Period A, the processing system may pause display updating and use time period B to perform capacitive sensing. During this time period, the processing system may not update any of the pixels in the display screen. Additionally, the processing system may drive transmitter signals on transmitter electrodes (e.g., one or more common electrodes) that are located in the black band on the display screen while transmitter electrodes located within the display screen displaying the frame remain inactive. Based on the resulting signals received during capacitive sensing, the input device derives positional information of an input object proximate to the region of the display screen currently displaying the black band. As discussed above, the input device measures a change in capacitive coupling between the transmitter electrodes carrying the transmitter signal and receiver electrodes. This capacitive change is then used to derive the positional information of an input object.

In one embodiment, the processing system may perform capacitive sensing during a plurality of consecutive horizontal blanking periods 815, for example, during the horizontal blanking periods 815 for Time Periods C-F. During each individual horizontal blanking period 815, only a portion of the information needed to acquire the capacitive measurement may be captured. That is, the horizontal blanking periods 815 may be too short for the input device to derive an accurate capacitive measurement for a particular transmitting electrode. However, after a performing capacitive sensing during a plurality of horizontal blanking periods 815, the input device may derive an accurate measurement of the change in capacitive coupling for a selected electrode. Such a method of capacitive sensing during a horizontal blanking time 815 is referred to herein as non-contiguous capacitive sensing because the sensing cycles of the transmitter signal are transmitted intermittently during each consecutive horizontal blanking period 815. Stated differently, non-contiguous capacitive sensing may be when capacitive sensing for a single transmitter electrode extends over two or more discontinuous time periods.

Alternatively or additionally, the processing system may pause updating the display in order to perform capacitance sensing. As shown in chart 800, the processing system inserts the black band using the pixels of rows 0-3 during Time Period A. However, at Time Period B, display updating is paused (e.g., the processing system does not immediately begin to update rows 0-3 according to the new data frame) while capacitive sensing is performed. Specifically, the capacitive sensing periods 820 are interleaved with the black band insertion and the row updates. Accordingly, the capacitive sensing period 820 may also be referred to as an in-frame blanking period, a long horizontal blanking period, or a long h-blank period where display updating is paused until the processing system performs capacitive sensing. The processing system resumes display updating for the same display frame after the first capacitive sensing period 820 expires. In one embodiment, the capacitive sensing periods 820 are longer than the horizontal blanking periods 815 and, in some embodiments, are at least as long as the pixel update period 810 or the row update 805. The duration of the capacitive sensing periods 820 may be adjusted according to the particular design of the input device. In addition to performing capacitive sensing during period 820, in one embodiment the processing system may also perform capacitive sensing during one or more horizontal blanking periods 815 of the display line updates 805.

Performing capacitive sensing to occur during the extended capacitive sensing period 820 rather than the horizontal blanking period 815 may allow the input device to measure accurately the change in capacitance for the selected electrodes (i.e., electrodes driving the transmitter signal) without interruption, which may improve interference susceptibility. Accordingly, performing capacitive sensing during an capacitive sensing period 820 is referred to herein as contiguous capacitive sensing since change in capacitive coupling is measured for a selected electrode or group of electrodes in a continuous time period.

During the capacitive sensing periods 820, the processing system may still drive signals on the transmitter electrodes that are not driving the transmitter signal—i.e., the transmitter electrodes that are external to the area defined by the black band. For example, while the transmitter signal is transmitted on one or more electrodes, the processing system may apply a reference voltage (or another other signal) to other electrodes in the display screen. Applying the reference voltage to the transmitter electrodes currently not being used for capacitive sensing may improve the ability of the input device to derive accurate positional information for the input object. Thus, when using common electrodes as the transmitter electrodes, the processing system may use all the common electrodes for capacitive sensing—e.g., the common electrodes within the black band carry the transmitter signal while the other common electrodes are fixed to a particular reference voltage.

The vertical blanking period 825 is the period between the last row update period of a display frame and the beginning of a row update period in a subsequent display frame. Although not shown in FIG. 8, timing chart 800 may also include a second vertical blanking period at the beginning of updating a display based on a received display frame—i.e., before Time Period A. Because in some embodiments the input device does not update the display during the vertical blanking periods 825, the processing system may use either the first or the second vertical blanking periods 825 (or both) to perform capacitance sensing. Similar to the capacitive sensing period 820, the vertical blanking periods 825 may facilitate contiguous capacitive sensing since both of these blanking periods may provide a sufficient length of time to measure the change in capacitance associated with a selected transmitter electrode without significant interruptions. However, the vertical blanking period 825 is distinguished from the capacitive sensing period 820 since this period 825 falls either at the beginning or end of the display frame update while the capacitive sensing period 820 is inserted between row updates of the same display frame.

In many embodiments, the length of a horizontal blanking period 815, capacitive sensing period 820 and/or a vertical blanking period 825 may be changed. However, the system designer may desire that the display frame rate (frames per second) remains unchanged. Therefore, as the length of one of these non-display update periods is changed, at least one of the other non-display update periods may also change. For example, in an embodiment where a capacitive sensing period 820 is included within the display frame, the duration of the horizontal blanking periods 815 and/or the vertical blanking period 825 may be decreased correspondingly. By reducing the horizontal blanking periods 815 corresponding to the row update periods 805, this extra time may be used to insert a capacitive sensing period 820 within a display frame update. Given that a horizontal blanking period 815 is "T" μs long, reducing the horizontal blanking period 815 to "N" μs for "M" corresponding rows means an in-frame blanking period 820 of length "(T−N)*M" μs may be created. In one embodiment, (T−N) may be reduced such that the horizontal blanking periods 815 still provide enough time for the necessary display update procedures. The duration of a capacitive sensing period 820 may be based on a sum of the reduction of each horizontal blanking period 815. In other embodiments, the duration of the in-frame blanking period 820 may be based on changing the vertical blanking period 825, or based on changing both the horizontal blanking periods 815 and the vertical blanking period 825.

The duration of an capacitive sensing period 820 may be set according to, for example, the amount of time required to perform contiguous capacitive sensing for a corresponding group of common electrodes, to mitigate noise from switching between capacitive sensing and display updating, to perform frequency hopping, change in the capacitive sensing frame rate to reduce noise interference, or to provide enough time to perform capacitive sensing for the transmitter electrodes within the black band. For example, for a group of electrodes, 100 μs may be needed for contiguous capacitive sensing. Therefore, a corresponding capacitive sensing period 820 is determined to be at least 100 μs in length. To free up 100 μs but still maintain the desired frame rate, one or more of the horizontal blanking periods 815 or the vertical blanking period 825 may be reduced.

Conclusion

Various embodiments of the present technology provide input devices and methods for improving usability. Specifically, the present technology drives a modulated signal on transmitter electrodes located only within a black image of the display device. Specifically, when updating a display screen based on a newly received display frame, an input device may first insert the black image on the display screen. For example, the input device may change the pixels on the first twenty rows of the display device to output the color black while the other rows continue to display the previous display frame. Once the black image is displayed, the input device may use the electrodes within the area of the screen displaying the black image to track the input object (e.g., determine if the user is pressing a finger or stylus on the screen). After performing capacitive sensing using the electrodes, the input device may replace the black image with display data from the new display frame. In this manner, performing capacitive sensing only affects the pixels displaying the black image which is not perceived by the user.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A method comprising:
    transmitting a first display image for display on a first portion of a display screen of a display device;
    transmitting a black image for display on the first portion of the display screen after outputting the first display image, wherein the black image comprises a plurality of contiguous display lines of the display screen;
    identifying a transmitter electrode located substantially within the first portion of the display screen; and
    driving, using a processor, a signal used for capacitive sensing on the identified transmitter electrode to determine positional information only upon determining that the black image is displayed in the first portion of the display screen.

2. The method of claim 1, wherein the first display image is a full display frame of the display screen comprising all of the display lines of the display screen.

3. The method of claim 1, wherein the black image is a black frame comprising all of the display lines of the display screen.

4. A method comprising:
    transmitting a first display image for display on a first portion of a display screen of a display device;
    transmitting a black image for display on the first portion of the display screen after outputting the first display image, wherein the black image comprises a plurality of contiguous display lines of the display screen, and wherein the black image is a black band comprising only a subset of the display lines of the display screen;
    identifying a transmitter electrode located substantially within the first portion of the display screen;
    driving, using a processor, a signal used for capacitive sensing on the identified transmitter electrode to determine positional information when the black image is displayed on the first portion of the display screen; and
    updating the first portion of the display screen based on one of the first display image and a second display image thereby removing the black image from the display screen.

5. The method of claim 4, further comprising:
    transmitting for display a second black image at a second portion of the display screen after updating the first portion of the display screen;
    identifying a different transmitter electrode located substantially within the second portion of the display screen;
    driving the signal on the different transmitter electrode to determine positional information when the black image is displayed on the second portion of the display screen.

6. A method comprising:
    transmitting a first display image for display on a first portion of a display screen of a display device;
    transmitting a black image for display on the first portion of the display screen after outputting the first display image, wherein the black image comprises a plurality of contiguous display lines of the display screen;
    identifying a transmitter electrode located substantially within the first portion of the display screen; and
    driving, using a processor, a signal used for capacitive sensing on the identified transmitter electrode to determine positional information when the black image is displayed on the first portion of the display screen, wherein transmitter electrodes in the display screen located outside of the first portion are not driven using the signal when driving the signal on the identified transmitter electrode.

7. A display device comprising:
    a display screen;
    a plurality of transmitter electrodes configured for determining positional information using capacitive sensing; and
    a processor configured to:
        transmit a first display image for display on a first portion of the display screen,
        transmit a black image for display on the first portion of the display screen after outputting the first display image, wherein the black image comprises a plurality of contiguous display lines of the display screen,
        identify a first one of the transmitter electrodes located substantially within the first portion of the display screen, and
        drive a signal used for capacitive sensing on the first transmitter electrode to determine positional information only upon determining that the black image is displayed in the first portion of the display screen.

8. The display device of claim 7, wherein the first display image is a full display frame of the display screen comprising all of the display lines of the display screen.

9. The display device of claim 7, wherein the black image is a black frame comprising all of the display lines of the display screen.

10. A display device comprising:
    a display screen;
    a plurality of transmitter electrodes configured for determining positional information using capacitive sensing; and
    a processor configured to:
        transmit a first display image for display on a first portion of the display screen,
        transmit a black image for display on the first portion of the display screen after outputting the first display image, wherein the black image comprises a plurality of contiguous display lines of the display screen, and wherein the black image is a black band comprising only a subset of the display lines of the display screen,
        identify a first one of the transmitter electrodes located substantially within the first portion of the display screen,
        drive a signal used for capacitive sensing on the first transmitter electrode to determine positional information when the black image is displayed on the first portion of the display screen, and
        update the first portion of the display screen based on one of the first display image and a second display image thereby removing the black image from the display screen.

11. The display device of claim 10, wherein the processor is configured to:
- transmit for display a second black image at a second portion of the display screen after updating the first portion of the display screen;
- identify a second one of the transmitter electrodes located substantially within the second portion of the display screen;
- drive the signal on the second transmitter electrode to determine positional information when the black image is displayed on the second portion of the display screen.

12. A display device comprising:
- a display screen;
- a plurality of transmitter electrodes configured for determining positional information using capacitive sensing; and
- a processor configured to:
  - transmit a first display image for display on a first portion of the display screen,
  - transmit a black image for display on the first portion of the display screen after outputting the first display image, wherein the black image comprises a plurality of contiguous display lines of the display screen,
  - identify a first one of the transmitter electrodes located substantially within the first portion of the display screen, and
  - drive a signal used for capacitive sensing on the first transmitter electrode to determine positional information when the black image is displayed on the first portion of the display screen, wherein transmitter electrodes of the plurality of transmitter electrodes located outside of the first portion are not driven using the signal when driving the signal on the identified transmitter electrode.

13. A processing system for a display device, the processing system comprising:
- a display driver module comprising one or more hardware elements configured to update a display screen, the display driver module configured to:
  - transmit a first display image for display on a first portion of a display screen of a display device, and
  - transmit a black image for display on the first portion of the display screen after outputting the first display image, wherein the black image comprises a plurality of contiguous display lines of the display screen; and
- transmitter circuitry configured to:
  - identify a transmitter electrode located substantially within the first portion of the display screen, and
  - drive a signal on the identified transmitter electrode used for capacitive sensing to determine positional information only upon determining that the black image is displayed in the first portion of the display screen.

14. The processing system of claim 13, wherein the first display image is a full display frame of the display screen comprising all of the display lines of the display screen.

15. A processing system for a display device, the processing system comprising:
- a display driver module comprising one or more hardware elements configured to update a display screen, the display driver module configured to:
  - transmit a first display image for display on a first portion of a display screen of a display device, and
  - transmit a black image for display on the first portion of the display screen after outputting the first display image, wherein the black image comprises a plurality of contiguous display lines of the display screen; and wherein the black image is a black band comprising only a subset of the display lines of the display screen; and
- transmitter circuitry configured to:
  - identify a transmitter electrode located substantially within the first portion of the display screen,
  - drive a signal on the identified transmitter electrode used for capacitive sensing to determine positional information when the black image is displayed on the first portion of the display screen,
- wherein the display driver module is configured to:
  - update the first portion of the display screen based on one of the first display image and a second display image thereby removing the black image from the display screen.

16. The processing system of claim 15, wherein display driver module is configured to transmit for display a second black image at a second portion of the display screen after updating the first portion of the display screen, and
- wherein the transmitter circuitry is configured to:
  - identify a different transmitter electrode located substantially within the second portion of the display screen, and
  - drive the signal on the different transmitter electrode to determine positional information when the black image is displayed on the second portion of the display screen.

17. A processing system for a display device, the processing system comprising:
- a display driver module comprising one or more hardware elements configured to update a display screen, the display driver module configured to:
  - transmit a first display image for display on a first portion of a display screen of a display device, and
  - transmit a black image for display on the first portion of the display screen after outputting the first display image, wherein the black image comprises a plurality of contiguous display lines of the display screen; and
- transmitter circuitry configured to:
  - identify a transmitter electrode located substantially within the first portion of the display screen, and
  - drive a signal on the identified transmitter electrode used for capacitive sensing to determine positional information when the black image is displayed on the first portion of the display screen, wherein transmitter electrodes in the display screen located outside of the first portion are not driven using the signal when driving the signal on the identified transmitter electrode.

* * * * *